vvvvvvvvvvvvvvvvv US009230731B2

(12) United States Patent
Wolfus et al.

(10) Patent No.: US 9,230,731 B2
(45) Date of Patent: Jan. 5, 2016

(54) FAULT CURRENT LIMITER WITH SATURATED CORE

(75) Inventors: Shuki Wolfus, Kiryat Ono (IL); Yossef Yeshurun, Ganei Tikva (IL); Alexander Friedman, Lod (IL); Vladimir Rozenshtein, Ihud (IL); Zvi Bar-Haim, Ihud (IL)

(73) Assignees: BAR ILAN Research & Development Company, Ramat Gan (IL); RICOR Cryogenic & Vacuum Systems Limited Partnership, Ein Harod (IL)

( * ) Notice: Subject to any disclaimer, the term of this patent is extended or adjusted under 35 U.S.C. 154(b) by 982 days.

(21) Appl. No.: 13/393,278

(22) PCT Filed: Aug. 31, 2010

(86) PCT No.: PCT/IL2010/000714
§ 371 (c)(1),
(2), (4) Date: Feb. 29, 2012

(87) PCT Pub. No.: WO2011/024179
PCT Pub. Date: Mar. 3, 2011

(65) Prior Publication Data
US 2012/0153927 A1    Jun. 21, 2012

Related U.S. Application Data

(60) Provisional application No. 61/272,198, filed on Aug. 31, 2009.

(51) Int. Cl.
*H02H 9/02* (2006.01)
*H01F 38/02* (2006.01)
(Continued)

(52) U.S. Cl.
CPC ............... *H01F 38/023* (2013.01); *H01F 3/10* (2013.01); *H01F 29/14* (2013.01); *H02H 9/02* (2013.01); *H02H 9/021* (2013.01)

(58) Field of Classification Search
CPC . H01F 29/14; H01F 38/023; H01F 2003/103; H01F 2006/001; H02H 9/02; H02H 9/021; H02H 9/023

USPC .......... 323/310, 361; 336/DIG. 1, 30; 361/18, 361/19, 57, 58, 93.1, 93.3, 93.6, 93.9; 363/50–53
See application file for complete search history.

(56) References Cited

U.S. PATENT DOCUMENTS 3,219,918 A    11/1965  Trench
4,045,823 A    8/1977  Parton
(Continued)

FOREIGN PATENT DOCUMENTS

GB       2493772 A  *  2/2013
JP       2001 358025    12/2001
(Continued)

OTHER PUBLICATIONS

Colonel Wm. T. McLyman, "Transformer and Inductor Design Handbook," 2004, Marcel Dekker, Inc., 3rd edition, Chapter 17.*
(Continued)

*Primary Examiner* — Adolf Berhane
*Assistant Examiner* — Jye-June Lee
(74) *Attorney, Agent, or Firm* — Locke Lord LLP

(57) ABSTRACT

A three-phase current limiter (30) for an alternating current system includes an AC magnetic circuit having at least one AC coil (35R1, 35S1, 35T1) for each phase of a 3-phase AC supply wound on a saturable ferromagnetic core and configured to subject respective AC coils for each phase to a common magnetic flux, and a DC magnetic circuit (34a, 34b) for biasing the AC magnetic circuit into saturation at normal conditions. In use the AC coils are connected in series with a load and during alternate half cycles of the AC supply at least one of the AC coils produces a magnetic field that opposes a magnetic field of the DC magnetic circuit. The AC coils (35R, 35S, 35T) for each phase are configured so that at least one of the AC coils exhibits unbalanced magnetic impedance relative to remaining ones of the AC coils for each phase.

36 Claims, 10 Drawing Sheets

(51) Int. Cl.
*H01F 3/10* (2006.01)
*H01F 29/14* (2006.01)

(56) References Cited

U.S. PATENT DOCUMENTS

| | | | |
|---|---|---|---|
| 7,193,825 B2 * | 3/2007 | Darmann et al. | 361/19 |
| 7,330,096 B2 | 2/2008 | Shah et al. | |
| 2006/0022783 A1 * | 2/2006 | Owen | 336/5 |
| 2006/0044105 A1 | 3/2006 | Darmann et al. | |
| 2010/0188786 A1 * | 7/2010 | Darmann | 361/93.9 |
| 2012/0154966 A1 * | 6/2012 | Wolfus et al. | 361/58 |
| 2014/0254056 A1 * | 9/2014 | Wilson et al. | 361/93.9 |

FOREIGN PATENT DOCUMENTS

| | | | |
|---|---|---|---|
| JP | 2002 118956 | | 4/2002 |
| JP | 2005 039965 | | 2/2005 |
| WO | 00/19458 | | 4/2000 |
| WO | WO 00/19458 | * | 4/2000 |
| WO | 2007/029224 | | 3/2007 |
| WO | 2009/121143 | | 10/2009 |
| WO | 2010/056122 | | 5/2010 |
| WO | WO 2010056122 A1 | * | 5/2010 |

OTHER PUBLICATIONS

Cigre Working Group A3.10, "Fault Current Limiters in Electrical Medium and High Voltage Systems", Technical Report, Aug. 2003.
"Air Core Reactors", copyright Trench Group 2012, [retrieved from the Internet on Aug. 14, 2012 using <URL: http://www.trenchgroup.com/Products-Solutions/Coil-Products/Air-Core-Reactors>].
V. Rozenshtein, A. Friedman, Y. Wolfus, F. Kopansky, E. Perel, Y. Yeshuran, Z. Bar-Haim, Z. Ron, E. Harel, and N. Pundak, "Saturated cores FLC—a new approach", IEEE Transactions on Applied Superconductivity, vol. 17, Issue 2, Jun. 2007, pp. 1756-1759.
B.P. Raju, K. C. Parton, and T. C. Bartram, "A current limiting device using super-conducting d.c. bias: applications and prospects", IEEE Transactions on Power Apparatus & Systems, vol. 101, No. 9, pp. 3173-3177, Sep. 1982.
V. Keilin, I. Kovalev, S. Kruglov, V. Stepanov, I. Shugaev, V. Shcherbakov, I. Akimov, D. Rakov, and A. Shikov, "Model of HTS three-phase saturated core fault current limiter", IEEE Transactions on Applied Superconductivity, vol. 10, No. 1, pp. 836-839, Mar. 2000.

* cited by examiner a<b

FAULT CURRENT LIMITER WITH SATURATED CORE

FIELD OF INVENTION

The present invention relates to single and three-phase fault current limiters (FCL).

REFERENCES

Prior art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] CIGRE Working Group A3.10 "*Fault Current Limiters in Electrical Medium and High Voltage Systems*" Technical Report, August 2003
[2] http://www.trenchgroup.com/Trench%20Group/Trench_Home/Trench_Start.html
[3] U.S. Pat. No. 7,330,096 "Fault Current Limiter", M. Shah et al. Feb. 12, 2008.
[4] V. Rozenshtein, A. Friedman, Y. Wolfus, F. Kopansky, E. Perel, Y. Yeshuran, Z. Bar-Haim, Z. Ron, E. Harel, and N. Pundak "*Saturated cores FCL—a new approach*", IEEE Transactions on Applied Superconductivity, IEEE Transactions on Applied Superconductivity, Vol. 17, Issue 2, June 2007, Pages 1756-1759.
[5] U.S. Pat. No. 3,219,918 "Current Limiting Apparatus", A. Trench, Nov. 23, 1965
[6] U.S. Pat. No. 4,045,823 "Current Limiting Devices for Alternating Current Systems", K. C. Parton, Aug. 30, 1977;
[7] B. P. Raju, K. C. Parton, T. C. Bartram, "*A Current Limiting Device Using Super-conducting D.C. Bias: Applications and Prospects*," IEEE Transactions on Power Apparatus & Systems, vol. 101, pp. 3173-3177, 1982
[8] V. Keilin, I. Kovalev, S. Kruglov, V. Stepanov, I. Shugaev, V. Shcherbakov, I. Akimov, D. Rakov, and A. Shikov, "*Model of HTS three-phase saturated core fault current limiter*", IEEE Transactions on Applied Superconductivity, vol. 10, No. 1, March 2000, pp. 836-839.
[9] US 2006/0044105 "*Superconducting fault current limiter*", F. Darman n et al. Mar. 2, 2006
[10] WO2007/029224 "*Fault current limiters (FCL) with the cores saturated by super-conducting coils*" Bar Ilan University and RICOR Cryogenic & Vacuum Systems, published Mar. 15, 2007
[11] JP 2002 118956 "*Current Limiter*", Mitsubishi Electric Corp., Apr. 19, 2002
[12] WO2010/056122 "*Current Limiter*", LIANDON B. V., May 20, 2010.

BACKGROUND OF THE INVENTION

Faults in electrical power systems cannot be avoided. Fault currents flowing from the sources to the location of the fault lead to high dynamical and thermal stresses being imposed on equipment e.g. overhead lines, cables, transformers and switchgears. Today's circuit-breaker technology does not provide a full solution to selectively interrupting currents associated with such faults [1].

The growth in electric energy generation and consumption and the increased interconnection between networks lead to increasing levels of fault currents. In particular, the continuous growth of electrical energy generation has the consequence that networks reach or even exceed their limits with respect to the short current withstand capability. Therefore, there is considerable interest in devices, which are capable of limiting fault currents. The use of fault current limiters (FCL) allows equipment to remain in service even if the prospective fault current exceeds its rated peak and short-time withstand current. Thus, replacement of equipment (including circuit-breakers) can be avoided or postponed to a later time. Moreover, the use of FCLs already in the design stage takes advantage of using lower cost equipment: e.g. transformers with lower impedance, cables with reduced cross-sections, circuit-breakers with lower current interruption capability etc. [1].

Sometimes the problem of the fault-current limiting may be resolved by inserting current limiting reactors (CLR) with constant inductance as seen e.g. in [2] for high voltage and in U.S. Pat. No. 7,330,096 [3] for low voltage cases. However, additional inductance may result in an undesired voltage drop and in a decrease in system stability and reliability. Therefore, a variable impedance device that changes from small negligible impedance at nominal current to high impedance at fault conditions is a most desirable solution for the fault-current limiting problem.

One of the most attractive principles for FCL realization with variable impedance is the saturated core FCL [4]. FIG. 1 illustrates schematically its principle of operation. An FCL 10 comprises two ferromagnetic cores 11*a*, 11*b*, which are kept in saturation during normal (i.e. non-fault) operation by the magnetic field 25*a*, 25*b* generated by two bias coils 13*a*, 13*b* fed from a DC supply 24. Two AC coils 12*a*, 12*b* are wound around these two cores and arranged in such a way that their field directions 26*a*, 26*b* for each half cycle of AC current are in opposite directions with respect to the bias field 25*a*, 25*b* (i.e. in the first half cycle, field direction 26*b* is opposite to the direction 25*b* in core 11*b*, and during the second half cycle 26*a* is opposite to the direction 25*a* in the core 11*a*). Thus, AC coils 12*a*, 12*b*, connected in series with AC source 21 and load 22, exhibit low impedance under normal (i.e. non-fault) conditions. In case of an overcurrent, the increased AC current in the AC coils drives the core (according to the sign of the AC current 11*a* or 11*b*) out of saturation and the impedance of the FCL increases. In short-circuit conditions, the limited fault current triggers the opening of a circuit-breaker 23 and maintain a proper operation of the AC system 20.

A major drawback of known FCLs is their large mass and volume [1] and early attempts for reducing the mass were proposed [5] more than 40 years ago. However, very high requirements for DC ampére-turns limited use of these devices to large power applications.

This limitation was to a great extent removed with development of super-conductivity applications. U.S. Pat. No. 4,045,823 to K. C. Parton et al. [6] discloses a current limiter for a power alternating current system. The current limiter has for each phase a pair of saturable reactors whose coils are wound in opposite directions relative to superconducting bias coils.

An example of a single phase FCL for medium voltage is described in [7]. From data revealed in this work it can be derived that the mean incremental permeability in a saturated core was about 1.6 and the magnetic field strength caused by the DC bias coil was more than 1000 Oersted. In [6] and [7] it is noted that the current-limiting level is matched to a specific current supplied to the bias coil. Thus, in cases of fault current levels lower than the designed level, it is possible that the FCL will react to provide insufficient impedance.

Interest in the saturated core FCL has been spurred by the development of high temperature superconductivity (HTS) applications such as [1, 4]. In [8] a three phase device with six cores and one DC superconductive bias coil is described. The transformer coupling between the AC coils and the DC bias coils, which causes low limiting capability for three phase symmetrical fault currents as well as influence on the DC supply in unbalanced load/fault conditions and in one and two phase fault currents, is another major disadvantage of known saturated core FCLs. Patents [5, 6] overcome this problem by adding additional inductances in series with a DC bias coil, but in doing so the first disadvantage of high mass is even further exacerbated.

FIG. 2 shows schematically a different known approach for a FCL 30 with saturated core as disclosed in [10]. The FCL 30, described therein, comprises a ferromagnetic core 31 having two first ("long") limbs 33a, 33b and two second ("short") limbs 32a, 32b. An AC coil 35 is wound around the two first limbs 33a, 33b such that AC current causes flux in one direction in both limbs in each half cycle. Two superconducting DC bias coils 34a, 34b surround limbs 32a and 32b thus providing flux in the first limbs 33a, 33b in opposite directions and causing saturation of the core 31 in the normal (i.e. non-fault) state. By such means, there is provided a closed magnetic circuit for the bias field and an open magnetic circuit for the AC field. The bias coils and their DC supply are arranged in such a way to provide a deep controllable saturation in normal conditions and also provide the possibility to reduce or even cancel DC current in fault conditions. Thus under normal conditions and in a wide range of the acceptable overload state desired low impedance may be provided by DC current changing. In fault current conditions during each half cycle, one of the limbs 33a or 33b is forced out of saturation. Thus increasing the impedance of the AC coil 35 causes an instantaneous increase of the voltage drop and fault current limiting. At the same time by increasing the voltage drop, a control signal may be provided for reducing or canceling DC current. It should be noted that an open magnetic circuit for the AC magnetic field provides a wide range of the fault-limiting level without the need for changing the DC bias field level.

FIG. 3 shows a similar principle as described in JP 2002 118956 [11], which discloses a current limiter that includes a pair of first and second magnetic cores 2a, 2b facing each other and an AC coil 3 wound around the cores 2a, 2b. However, in this case the cores 2a, 2b are maintained in saturation state at normal conditions by two permanent magnets 1a, 1b. The ferrous parts of this construction appear as an open magnetic circuit for flux caused by AC current and as a closed magnetic circuit for flux caused by permanent magnets 1a, 1b. In this respect, the FCL shown in FIG. 3 is the same in principle as the FCL depicted in FIG. 2, but unlike it, there is no possibility to vary the impedance in the normal state and an additional disadvantage of a FCL with permanent magnets is thermal stress at least in fault conditions, which can increase the required recovery time, similar to resistive superconducting FCL devices [1, 4].

The saturated cores of the FCL as described in [5,10,11] are suitable for only a single phase of a 3-phase supply. Thus practical 3-phase AC systems require three such ferromagnetic structures, thus resulting in a massive construction.

WO 2010/056122 [12] published after the priority date of the present application, discloses a 3-phase current limiter wherein three AC coils for each of the respective phases are wound on the same core. The AC coils (termed "flux generators") are all three wound in the same direction with respect to each other (e.g. clockwise or counterclockwise, with respect to a coil axis). It is stated that this yields the particularly great advantage in the use of the three-phase current that in case of fully balanced currents (of the three phases) the magnetic fluxes generated by the three AC coils can cancel each other out completely.

While this is true, this prevents the core from being de-saturated in a balanced fault current event, as is required for limiting the fault currents and so the current limiter taught by [12] appears to be incapable of operation for balanced fault current events.

SUMMARY OF THE INVENTION

Objects of the present invention are therefore to achieve:
1. Reduced mass and dimensions of a saturated core FCL;
2. Reduced transformer coupling between AC coils and DC bias coil(s); and
3. A reduction in the magnetic field strength of the DC bias field (ampere-turns need for providing low impedance in normal state conditions).

In accordance with a first aspect, the invention achieves these objects by:
Using only a single saturated core for single and three phase FCLs thus decreasing mass and volume of the FCL;
The ability to use a closed magnetic circuit for the DC bias coil(s) so as to allow the core to be maintained in a state of deep controllable saturation at a wide range of the load (and acceptable overload) current;
The ability to use an open magnetic circuit for the AC coil(s) so as to provide appropriate limiting capability over a wide range of fault currents without the need to vary the bias current as is necessary in devices such as described in U.S. Pat. No. 4,045,823;
Employing an improved and novel configuration of ferromagnetic core and three phase AC coils so as to provide an applicable level of the FCL impedance in normal and fault-current limiting conditions with especially low magnetic field strength of the DC bias field (200-300 Oersted) and also to significantly decrease transformer coupling between AC and DC coil(s). The cost of the resulting FCL is reduced regardless of whether superconducting bias coil(s) or conventional non-superconducting wire bias coil(s) are used.

These objects are realized by winding all three-phase AC coils on the same core while taking steps to introduce asymmetry in the magnetic properties of the coils. This is necessary since the vector sum of the three phase voltages across magnetically symmetrical AC coils is zero in a balanced fault current event and this prevents the core from being de-saturated, as required for limiting the fault currents.

It should be noted that within the context of the description and the appended claims, the terms "asymmetry" and "unbalanced" are equivalent. The AC coils for each phase are thus configured so that at least one of the AC coils for each phase exhibits unbalanced magnetic impedance relative to remaining ones of the AC coils for each phase. In other words, in each triplet, two the AC coils may have the same magnetic impedance while the third is different or, alternatively, all three coils in each triplet may have different magnetic impedances. It should also be noted that the imbalance may be due to different self-impedances of the three AC coils or to different mutual impedances thereof.

Thus in accordance with one aspect of the invention there is provided a three-phase current limiting device for an alternating current system, the three-phase current limiting device comprising:

an AC magnetic circuit having at least one AC coil for each phase of a 3-phase AC supply, wound on a saturable ferromagnetic core and configured to subject respective AC coils for each phase to a common magnetic flux, and a DC magnetic circuit for biasing the AC magnetic circuit into saturation at normal conditions;

said AC coils being so configured that in use they are connected in series with a load and during alternate half cycles of the AC supply at least one of the AC coils produces a magnetic field that opposes a magnetic field of the DC magnetic circuit; and the AC coils for each phase being configured so that at least one of the AC coils exhibits unbalanced magnetic impedance relative to remaining ones of the AC coils for each phase.

In accordance with different embodiments, the AC magnetic circuit may be open or closed and the DC magnetic circuit may likewise be open or closed thus exhibiting four essentially different arrangements, each of which is subject to variations as described in detail below.

In accordance with some embodiments the DC magnetic circuit is realized by at least one DC bias coil that is preferably wound around a different limb of the magnetic circuit on which the AC coils are wound so as to avoid or reduce magnetic coupling between the AC coils and the DC bias coils.

In accordance with some embodiments the AC magnetic circuit includes opposing limbs on each of which three AC coils for the three phases are disposed so that a first coil for each of the three phases is on one limb and a second coil for each of the three phases is on the opposing limb. The respective coils for each of the three phases are connected in series. In a further variation of this embodiment, a DC bias limb is coupled to the closed magnetic circuit intermediate the opposing limbs thereof, and the at least one DC bias coil is wound around the DC bias limb.

In order to simplify the following description, we will refer to the limbs of the AC magnetic circuit on which the AC coils are wound as "first" limbs and to the other limbs as "second" limbs. However, it is to be noted that this terminology is not intended to be limiting and the first and second limbs may spatially overlap or may be formed by a mathematically continuous line. Thus, in an arrangement of the kind shown in FIG. 2, the long limbs of the magnetic circuit are the "first" limbs while the short limbs, on which the DC coils are wound, are the "second" limbs. However, in such an arrangement, the DC coils could be wound on the long limbs adjacent to or even overlapping the AC coils. Likewise, while in those embodiments having a closed core where AC coils are wound around a single limb of the AC magnetic circuit, such as shown in FIGS. 6, 7, 8, 9 12 and 14, all three AC phase coils of each pair are shown on the same "first" limb of the AC magnetic circuit, it will be understood that the magnetic circuit is unchanged if one or both of the outer AC coils is shifted on to the adjacent "second" limb. Furthermore, while the core is shown as rectangular in shape, it could be elliptical in which case the demarcation between first and second limbs is less clear.

For all these reasons, a measure of caution and flexibility is required in construing the terms "first" and "second" limbs since they are not necessarily realized by geometrically uniquely defined structures. It is therefore more generally correct to interpret the first limbs of the AC magnetic circuit in the sense that regardless of its specific geometry, the AC magnetic circuit is adapted to subject the AC coils for each phase of the 3-phase AC supply to a common magnetic flux.

In order to avoid ambiguity, where necessary we shall refer to the limbs on which the AC coils are mounted as the "AC circuit limbs".

In accordance with some embodiments the at least one DC bias coil is a superconducting coil.

In accordance with some embodiments the AC coils are wound with different numbers of turns so as to achieve asymmetrical magnetic impedance.

In accordance with some embodiments the AC coils are disposed on different portions of the AC circuit limbs so as to achieve asymmetrical magnetic impedance.

In accordance with some embodiments the AC coils have different coil geometries so as to achieve asymmetrical magnetic impedance.

In accordance with some embodiments a respective decoupling loop is wound on each of the AC circuit limbs so as to at least partially inhibit flux transfer between the AC coils.

In accordance with some embodiments, a three-phase FCL has at least one DC bias coil or permanent magnet and a single saturated ferromagnetic core, forming an open magnetic circuit for the AC coils and a closed magnetic circuit for the bias field. The DC bias coils provide a controllable level of saturation of the ferromagnetic core and are mounted orthogonal to the AC flux direction on a core segment where the net AC flux across the DC coil is minimal. Such a design allows construction of a three-phase FCL with a saturated core having lower mass and dimensions than comparable known FCLs and also reduces or eliminates the transformer coupling between the AC coils and the DC bias coil(s) thus decreasing the AC voltage induced in the DC bias coil(s).

In accordance with some embodiments, the core is rectangular with the AC coils wound on the long limbs so as to surround both long limbs of the ferromagnetic core. In accordance with another embodiment, each phase comprises two AC coils: a first coil wound around one "long" limb and a second coil wound around another "long" limb. The AC coils are connected in series in such a way that flux direction caused by AC current in these coils is in the same direction for each half cycle.

In accordance with some embodiments, improved saturation of the first limbs of the saturated ferromagnetic core of the FCL is achieved by using as second limbs of the core yokes with larger cross-section and/or larger saturation induction. By such means, a lower quantity of the incremental permeability in the "first" limbs may be achieved with fewer ampere-turns of the DC bias coil(s).

According to another aspect of the invention, there is provided an FCL having a "2-dimensional" magnetic core wherein for each phase of a 3-phase AC supply a pair of AC coils is wound on opposing first limbs and a pair of DC bias coils is wound on opposing second limbs. Means are provided to introduce asymmetry in the magnetic properties of the AC coils on each limb.

In such an arrangement the ratio of the impedance of the FCL in current-limiting and nominal conditions is lower than for conventional devices. In order to increase this ratio, it is necessary to increase the length of the device.

This may be achieved by a "split" (or three-dimensional) core, which provides also closed magnetic circuits for the AC field but in a plane that is perpendicular to the main direction of the bias field. By such means, in addition to the advantages mentioned above, a high ratio of impedance in fault current-limiting and normal conditions is achieved with a low level of transformer coupling between AC and DC bias coil(s). This second aspect of the invention may be useful for single phase device as well as for three phase devices.

In a variation of such an embodiment, the DC bias circuit includes at least one DC bias coil whose axis is normal to parallel planes formed by the limbs on which the AC coils are wound. The AC coils on each limb are configured so as to exhibit asymmetrical magnetic impedance.

In some embodiments, the DC bias field may be common to all three phases of a three-phase FCL.

Reference [4] discusses the theoretical minimum volume of a ferromagnetic core for given FCL characteristics, i.e. its normal and fault state impedances and voltages. We will define here the parameter, k, as the ratio between the actual ferromagnetic volume of an FCL to the minimal theoretical volume. Hence, compact FCL designs may be characterized by low k values. Assessments of the k values of references [6,9] yield results of about 10. In the same manner references [10,11] offer k values of 4-6. At least some of the embodiments according to the present invention are more compact and exhibit k values of 3-3.5.

Further, the arrangement of the AC coils for a three-phase FCL significantly affects the above-mentioned ratio k. Thus, when the arrangement has partially overlapping coils, a ratio k of 3-3.5 for a 3-phase FCL may be achieved. At the same time, acceptable current-limiting capability for all kinds of fault currents may be provided. To this end, additional decoupling coil(s) may be provided, to control and decrease mutual inductance between AC coils and lower the voltage drop across the FCL in the nominal state.

In accordance with other embodiments, a split ferromagnetic core is provided having two closed magnetic circuits for DC bias coils (or permanent magnets), while for each phase, two pairs of AC coils are mounted on the split core and so configured that for flux caused by AC current in each pair of coils, the magnetic circuit appears as an open circuit. On other hand for flux caused by AC current in complementary coils in each pair, the magnetic circuit appears closed. By such means, lower impedance in the normal state and higher impedance in fault current limiting state may be achieved.

In accordance with some embodiments the FCL comprises means for decreasing or eliminating DC bias field in fault conditions whereby fault limiting capability may be increased.

The split core has a half cross-section comparable with a conventional unitary core such that the mass and volume of a 3-phase FCL according to the invention are of the same order of magnitude of those of conventional single phase devices. The FCL with split core may be used as a single phase device and may be provided with permanent magnet(s) instead DC bias coils or with combined permanent magnets and bias coils.

BRIEF DESCRIPTION OF THE DRAWINGS

In order to understand the invention and to see how it may be carried out in practice, some embodiments will now be described, by way of non-limiting example only, with reference to the accompanying drawings, in which.

DESCRIPTION OF EMBODIMENTS

In the following description of some embodiments, identical components that appear in more than one figure or that share similar functionality will be referenced by identical reference symbols.

Figure 4A:
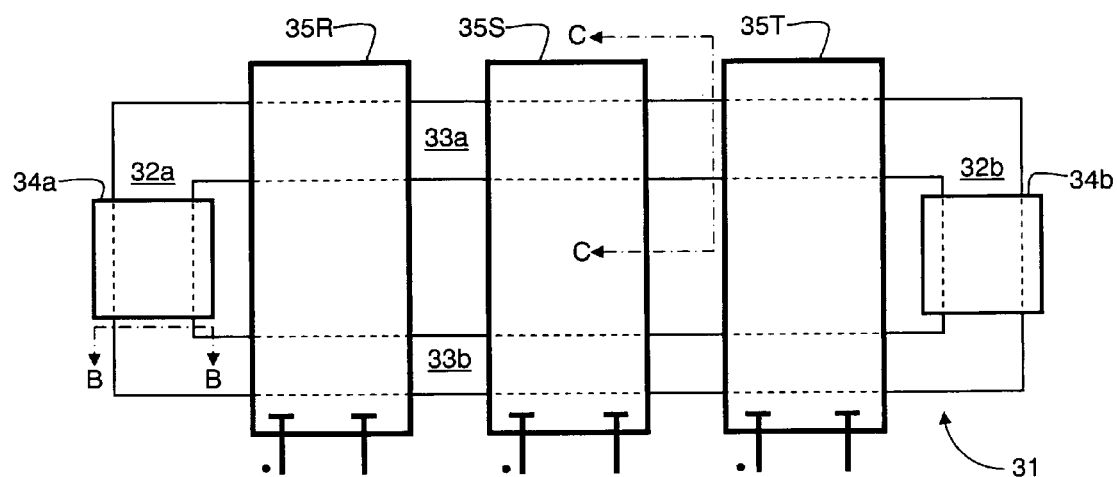
FIG. 4a shows schematically a simplified design of a three-phase FCL in accordance with a first embodiment of the invention having a magnetic core of square cross-section as shown in FIGS. 4b and 4c.

FIG. 4a shows schematically a three-phase FCL 30 having a ferromagnetic core 31 comprising "short" limbs 32a and 32b (constituting "first" limbs) and "long" limbs 33a, 33b (constituting "second" limbs). Respective bias coils 34a, 34b are wound on the short limbs 32a, 32b for maintaining the core 31 in controllable saturation. The DC bias coils 34a, 34b constitute magnetic biasing means for biasing the DC magnetic circuit into saturation at normal conditions. In this and all subsequent embodiments, this may also be achieved using permanent magnets or a combination of DC bias coils and permanent magnets.

Figure 1:
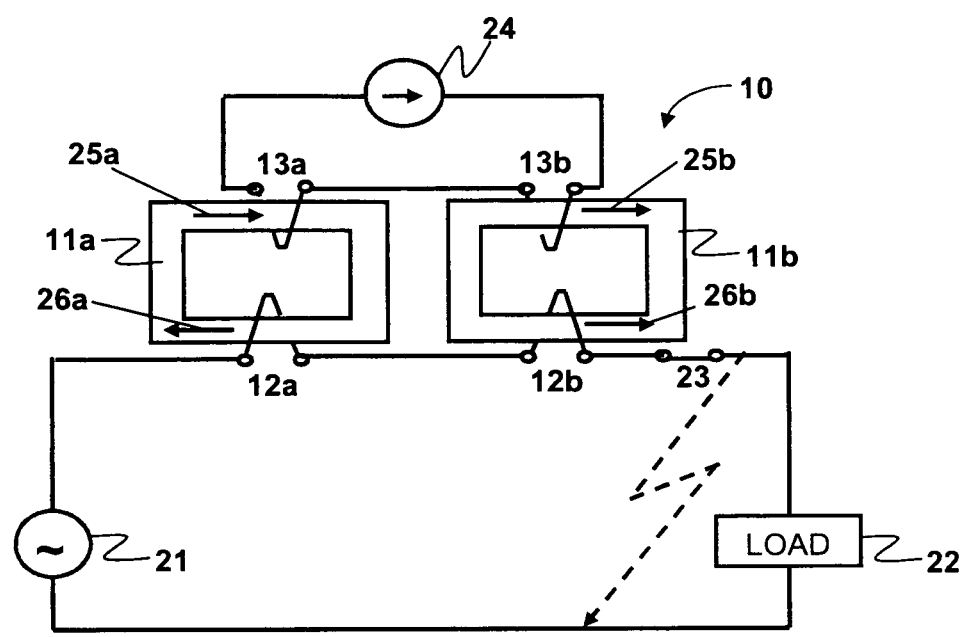
FIG. 1 illustrates schematically the principle of a prior art fault current limiter (FCL) with saturated cores as described in U.S. Pat. No. 4,045,823.
Figure 2:
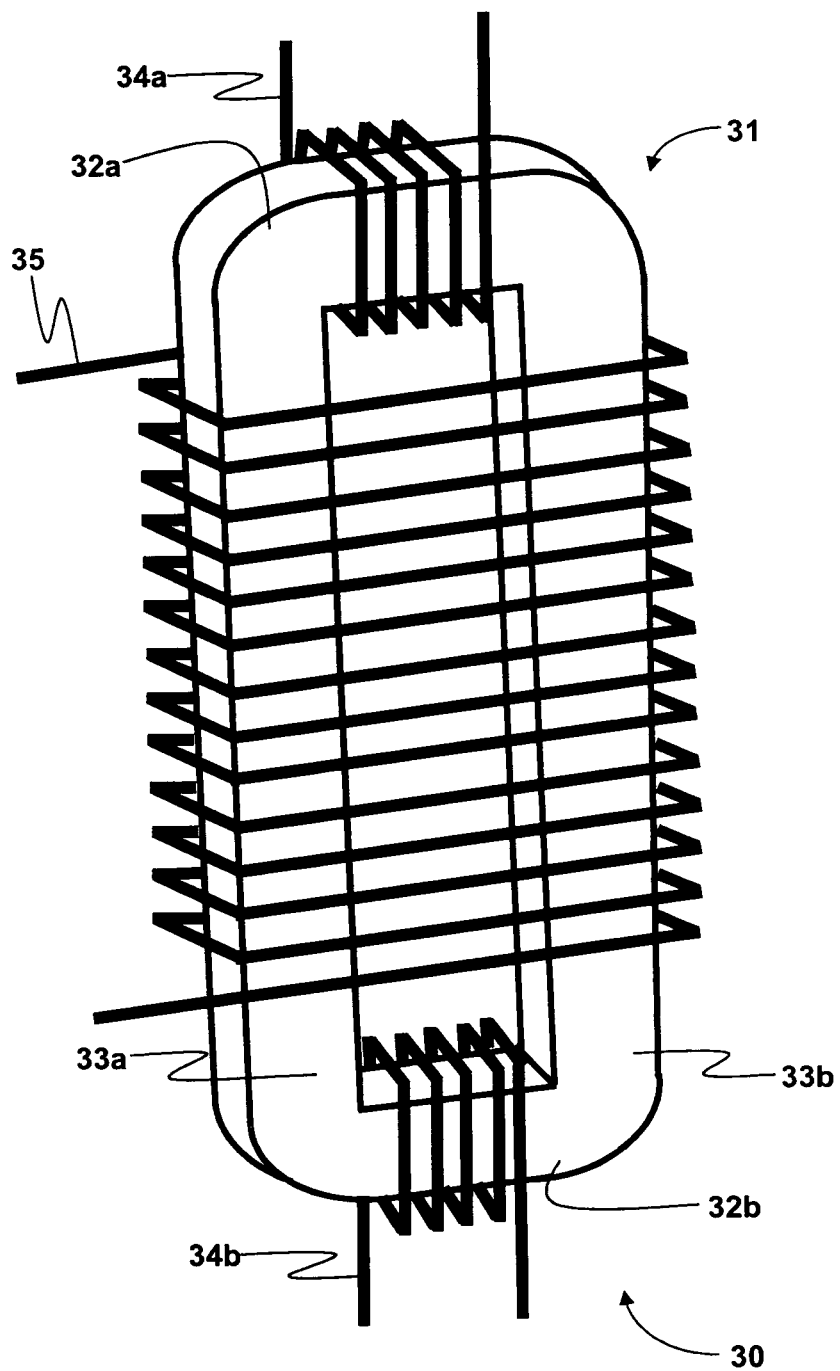
FIG. 2 shows a prior art saturated core FCL as described in WO2007/029224.
Figure 3:
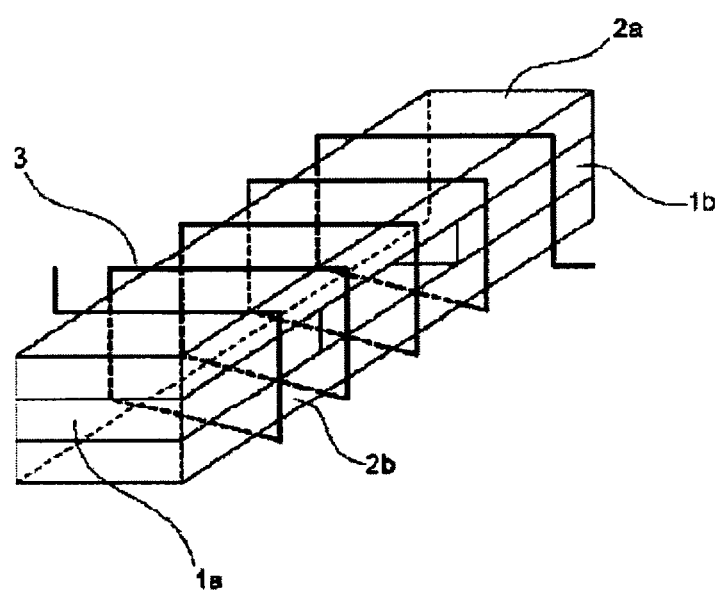
FIG. 3 shows a prior art saturated core FCL as described in JP 2002 118956.

Respective AC coils 35R, 35S, 35T, one for each phase of a 3-phase supply, are wound in mutual spatial proximity around both the long limbs 33a and 33b in a manner similar to that described in WO2007/029224 and shown in FIG. 2. The ferromagnetic core 31 may be a wound (C-core) or a stacked core and may be of constant cross-section, although, as noted above, this is not mandatory. The DC current in the bias coils 34a, 34b produces flux in limbs 33a, 33b in opposite directions, and the AC current in each half cycle in each phase produces flux in the limbs 33a, 33b in the same direction. Consequently, the closed magnetic circuit for the flux produced by the DC bias current gives rise to saturation of the limbs 33a, 33b thereby achieving low impedance for AC coils 35R, 35S, 35T in normal (non-fault) conditions. At the same time, the open magnetic circuit for the flux caused by the AC currents gives rise to current-limiting capability over a wide range of fault currents. In the figures, the symbol '•' is used to denote start of a coil.

It should be noted that a central portion of the long limbs will always be less saturated than the extremities and consequently the self-inductance of the middle AC coil 35S (LS) will be higher than the self-inductance of the outer AC coils 35R(LR), 35T(LT) even in the case where all three coils have the same number of turns and dimensions. Furthermore, the mutual inductance between the two outer coils 35R and 35T denoted by MRT is less than that between the middle coil 35S and either of the outer coils 35R or 35T and denoted by MSR or MST. As a result, in the event of a short circuit between two phases (e.g. R-S) the current-limiting capability will be defined by the inductance of the two respective AC coils 35R, 35S which equals LR+LS−2*MSR, because the short current in these coils flows in opposite directions. This asymmetry also ensures that in the case of a three-phase short circuit, the magnetic circuits for the AC coils 35R, 35S, 35T are not symmetrical so that the vector sum of the voltage drops caused by fault currents in the three AC coils is not zero and the sum of the magnetic strength ensures de-saturation of the respective magnetic circuits, thus maintaining the current-limiting capability of the FCL.

Thus, the characteristics of the AC coils 35R, 35S, 35T (such as number of turns, geometry, overlapping portion and position on core or any combination thereof) should be designed such that a three-phase FCL meets the following requirements:
- acceptable impedance and voltage drop through all phases AC coils in normal state,
- acceptable imbalance in voltage drop through all the AC coils in all phases in normal state,
- acceptable limiting capability for all types of short circuit currents (one, two and three phases).

Such a three-phase FCL in accordance with this embodiment may be designed with a ratio k=3-5 providing major savings in ferromagnetic volume and in the number of turns in the bias coils compared to three conventional single-phase FCLs such as shown in [10].

Figure 4B:
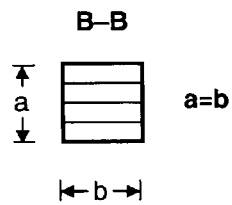
Figure 4C:
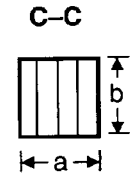
Figure 5A:
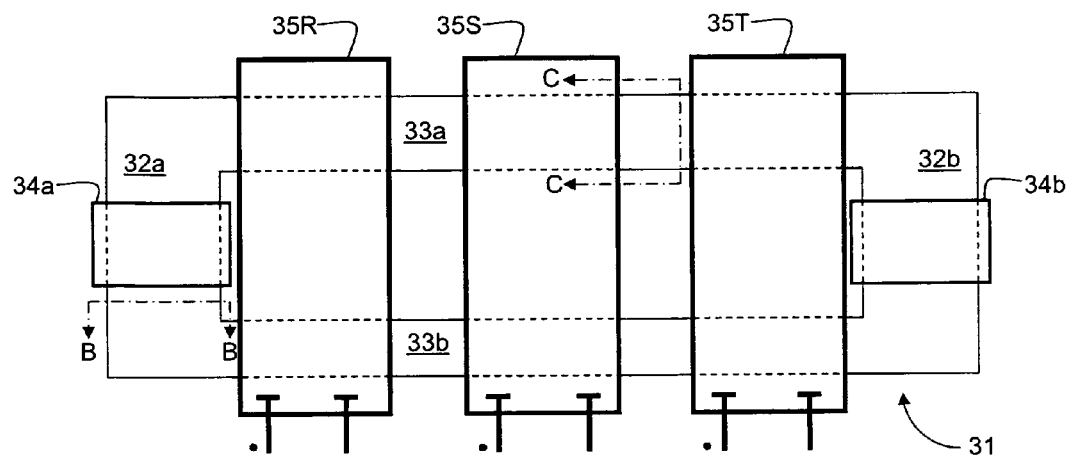
FIG. 5a shows schematically a modified FCL according to an aspect of the invention having intense saturation with fewer ampére-turns of the DC bias coils having a magnetic core of rectangular cross-section as shown in FIGS. 5b and 5c.
Figure 5B:
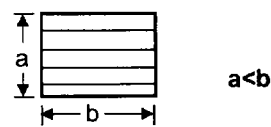
Figure 5C:
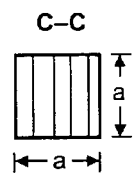

In the magnetic circuit shown in FIG. 4a the magnetic core is of square cross-section as shown in FIGS. 4b and 4c where FIGS. 4b and 4c are cross-sectional views taken along the lines B-B and C-C, respectively, in FIG. 4a. However, in this and all other embodiments, the cross-section of the core need not be square and may, for example, be rectangular as shown in FIG. 5a where likewise FIGS. 5b and 5c are cross-sectional views taken along the lines B-B and C-C, respectively, in FIG. 5a. Moreover, although the cross-sections in both FIGS. 4a and 5a are shown as parallelograms, this too is not a requirement of the invention and other shapes may be employed. For example, cores having circular or elliptical cross-sections may also be used. It should also be noted that the cross-section need not be uniform along the complete length of the core.

As was noted above, for saturation of the central part of the limbs 33a, 33b more ampére-turns of the DC bias coils are needed owing to flux dispersion at high flux density conditions. The flux density in the short limbs 32a, 32b can be reduced by constructing these limbs as "yokes" with larger cross-section compared to that of the long limbs 33a, 33b, as shown in FIGS. 5b and 5c. These "yokes" may be made from magnetic material with larger saturation induction (flux density) and/or from different lamination or non-laminated ferromagnetic material. It should be noted that the required saturation in the long limbs may be achieved using additional means e.g. additional DC coils, electromagnets or permanent magnets and appropriate increase of the cross-section and changes to the geometry of the yokes.

Figure 6:
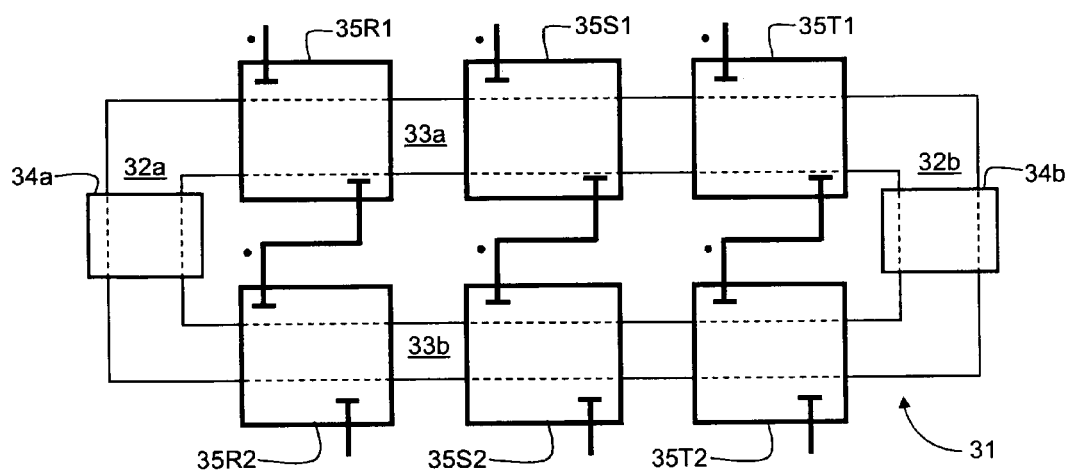
FIG. 6 shows schematically a different arrangement of the three phases AC coils on the saturated core of the FCL depicted in FIG. 5.

FIG. 6 shows another embodiment wherein instead of the two long limbs 33a and 33b forming an open core around which all of the AC coils are wound to form an open magnetic circuit, each of the AC coils is formed by a series-connected couplet wound around each of the long limbs separately. Thus, the AC coil for the R phase comprises a pair of coils 35R1 and 35R2 wound on limbs 33a and 33b, respectively. A coil couplet 35S1, 35S2 for the S phase, and a coil couplet 35T1, 35T2 for the T phase are wound in similar manner. The AC coils are connected in such a way that the magnetic flux caused by the AC current in each phase will act in the same direction through both limbs 33a, 33b during each half cycle. Thus, the magnetic circuit for the flux caused by the AC current appears as an open circuit and the FCL in accordance with this embodiment works in a similar manner as described above.

Figure 7:
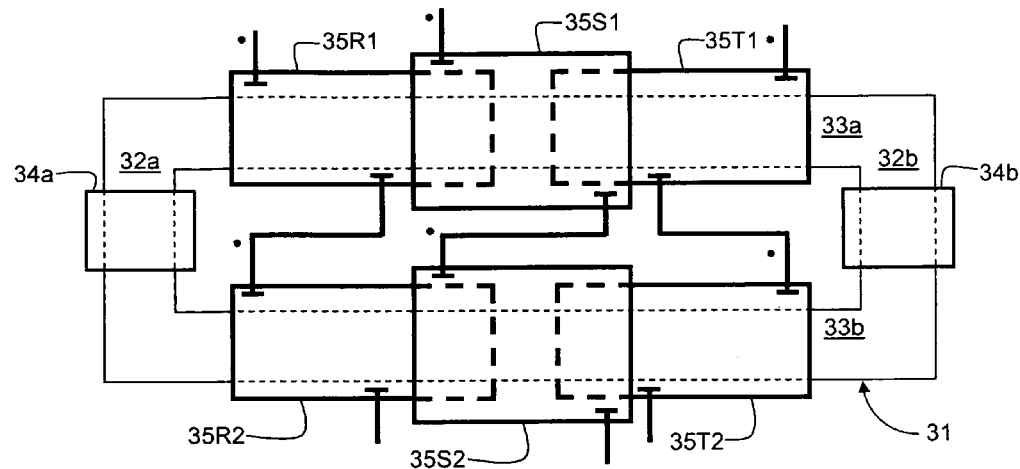
FIG. 7 illustrates an embodiment of an arrangement of the AC coils with partially overlapping location of the AC coils in R-S and S-T phases.

FIG. 7 shows a variation of this embodiment where the respective AC coil couplet for each of the three phases is implemented in such a way that the R and T phase coils 35R1 and 35T1 on the limb 33a as well as the R and T phase coils 35R2 and 35T2 on the limb 33b are spaced apart by a distance that equals approximately 20% of the length of the coils. The respective S-phase coils 35S1 and 35S2 are wound in overlapping relationship with the R and T phase coils such that their self-inductance LS equals approximately 1.5*LR (or LT) and such that their mutual inductance MSR=MST equals approximately 40% of self-inductance of the R or T phases (i.e. MSR=0.4*LR). This is achieved by appropriate placement and geometry of the coils. The self-inductance of the coils is a function of their cross-section and number of turns.

As a result, the fault current-limiting capability for a two-phase short circuit will be approximately the same as for one and three-phase short circuit, because 1.5*LR+LR−0.8*LR≈1.7*LR. In this embodiment the combined length of the AC coils for the three phases is approximately 2.2 larger than the required length of a single phase coil, thus allowing a ratio k equal to 3-3.5 to be approached. It should be noted that the mutual inductance between the R and T phases coils (MRT) reduces the current limiting capability in the event of a R-T short circuit. At the same time this mutual inductance causes an increased imbalance of the drop voltage in normal state conditions.

Figure 8:
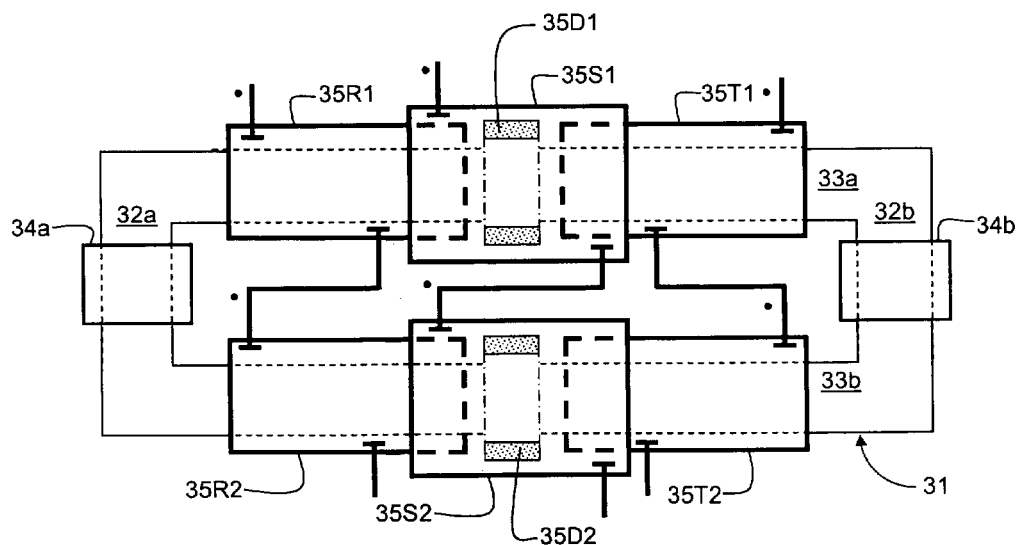
FIG. 8 shows schematically an FCL according to an embodiment of the invention for decreasing the mutual inductance between the AC coils in R-S, R-T and S-T phases by an additional decoupling coil.

FIG. 8 shows a variation of the embodiment shown in FIG. 7 and illustrates one possibility to control mutual inductances between the three phases AC coils, especially between R and T phase coils (namely between 35R1 and 35T1, 35R2 and 35T2). Respective decoupling coils 35D1 and 35D2 are wound around limbs 33a and 33b and located between the respective R and T phase coils 35R1, 35T1 and 35R2, 35T2. The decoupling coils 35D1 and 35D2 may be implemented with various numbers of turns and wire cross-sections and may be used as either short-circuit coils or may be connected to a variable external load, so as to provide additional means for adjustment of the three-phase FCL parameters in the design stage. Likewise, the decoupling coils may be constructed so as to allow their number of turns and/or cross-sections to be changed during use. The decoupling coils sufficiently decrease the impedance of all the three-phase AC coils, especially that of the 35S135S2 coils, such that the required low impedance in nominal state may be achieved with fewer ampere-turns of the DC bias coils.

All above described embodiments of the invention may include a current reduction/switching unit in the DC circuit between output of the DC supply and the DC bias coil(s) and controlled by the voltage drop on the AC coil(s) as described in WO2007/029224 for reducing or interrupting the DC current during fault conditions. An energy absorbing circuit may likewise be connected in parallel with the DC bias coils for fast discharging of the DC bias coil(s). The fast interruption of the current in the DC bias coil(s) during fault conditions increases the current-limiting capability of the FCL.

Figure 9:
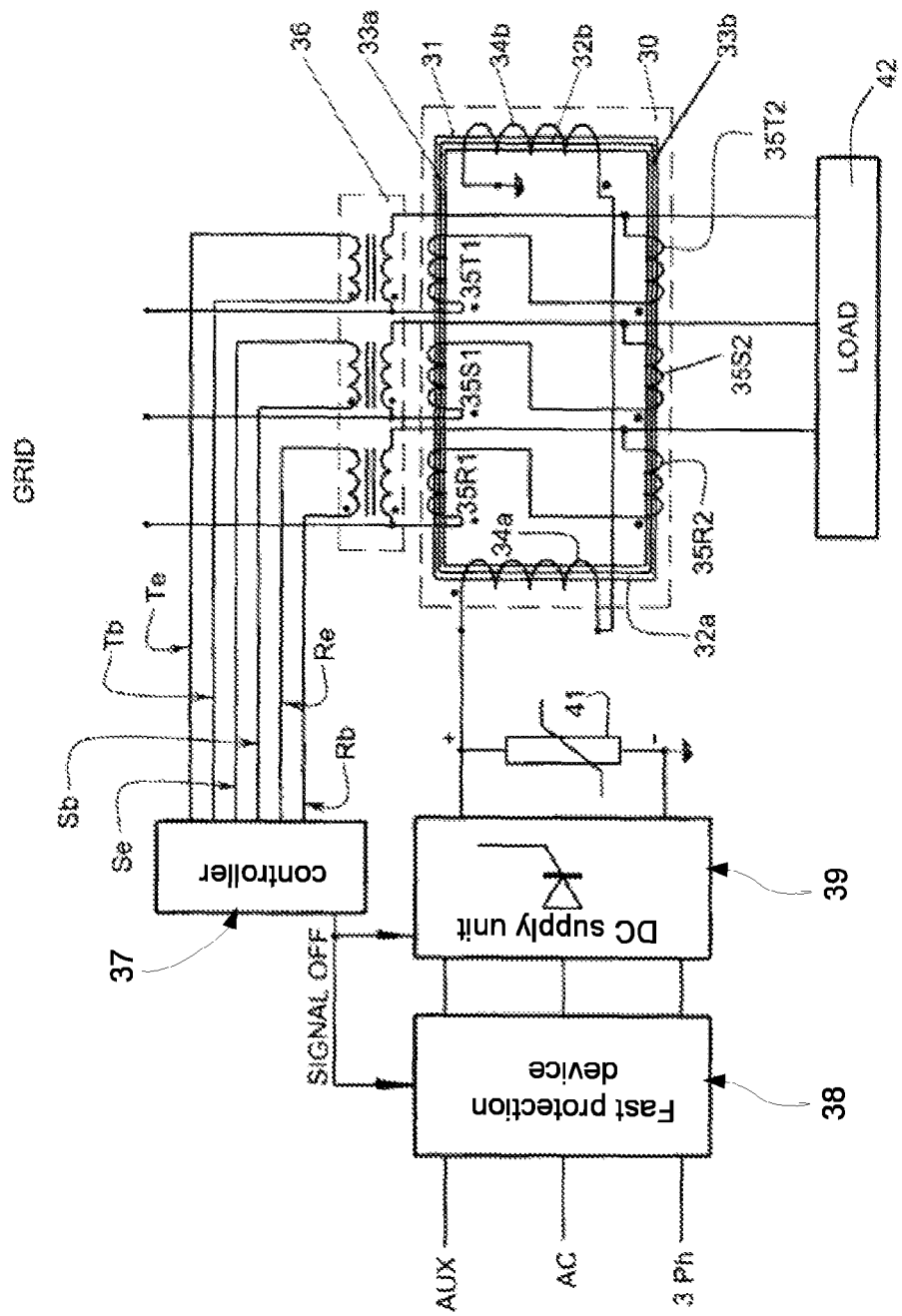
FIG. 9 shows schematically connection of a DC supply unit to the AC supply and to the bias coils with means for DC discharge in fault conditions.

FIG. 9 is a schematic circuit diagram showing one embodiment of the three-phase FCL 30 when used in a high voltage (HV) application. The AC coils 35R1, 35S1, 35T1 surround limb 33a and AC coils 35R2, 35S2, 35T2 surround limb 33b. The limbs 33a and 33b are maintained in a saturated state under normal (i.e. non-fault) conditions by two DC bias coils 34a, 34b, which are energized by a DC supply unit 39 with full controlled bridge. The two AC coils for each phase, e.g. 35R1 and 35R2, are connected in series between a HV grid and a HV load 42 and these series-connected phase coils are connected in parallel with the respective primary winding of a three-phase transformer 36 whose secondary windings are connected to the input of a controller 37 that feeds a control signal to a fast protection device 38 and to the DC supply unit 39. A voltage limiting circuit 41 is connected across the output of the DC supply unit 39. In operation, the three-phase high voltage transformer 36 measures voltage drops through all the AC coils of the FCL. The controller 37 is responsive to a sudden increase in voltage corresponding to a short-circuit fault for feeding an interruption signal to the fast protection device 38 for disconnecting the DC supply unit 39 from the AC supply. The energy of the DC bias coils is discharged by a voltage limiting circuit 41. After interruption of the fault current, the abnormal voltage drop measured by the respective phase of the three-phase transformer 36 is eliminated and the controller 37 acts to restore the DC supply.

Figure 10:
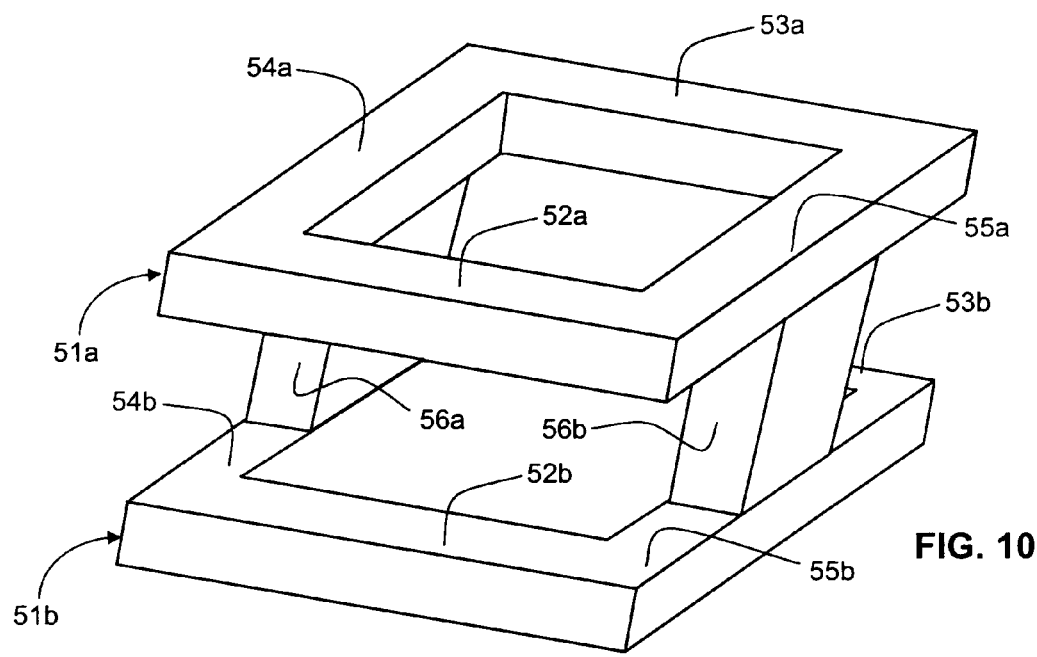
FIG. 10 is a pictorial representation of a split core with two "short" limbs for DC bias coils, which can be also permanent magnets and four "long" limbs for AC coils.

FIG. 10 is a pictorial representation of a split core 50 having two spaced apart closed magnetic circuits formed by annular cores 51a and 51b each having a respective pair of long limbs 52a, 53a, and 52b, 53b joined by respective "intermediate" limbs 54a, 55a and 54b, 55b, opposing ones of which are interconnected by limbs 56a, 56b. The long limbs 52a, 53a, and 52b, 53b support AC coils as described previously. The limbs 56a, 56b constitute DC bias limbs that are coupled to the closed magnetic circuit formed by the annular core intermediate the respective second limbs thereof and serve to conduct magnetic flux through the annular core. The two annular cores 51a and 51b form two parallel closed magnetic circuits for flux caused by DC bias coils. Thus, likewise, the magnetic circuits for flux caused by AC coils surrounding the limbs 52a, 53a, and 52b, 53b also appear as closed magnetic circuits, so that the impedance in the nominal state defined by incremental permeability in these limbs will be very small while in fault current-limiting conditions the impedance will increase more than in the case of an open magnetic circuit.

Although this embodiment employs two spaced apart annular cores, a similar effect can be achieved by a single annular core, whose respective second (short) limbs are interconnected by a DC bias limb disposed intermediate the second limbs.

In either embodiment, the DC flux that flows into the annular core from the DC bias limbs splits when it meets the junction of the second limb and the DC bias limb, so as to flow in the same direction through both of the long limbs of the magnetic core. This allows the AC coils to be wound in opposite directions, thus forming a closed AC magnetic circuit. This provides better conservation of magnetic flux.

Figure 11:
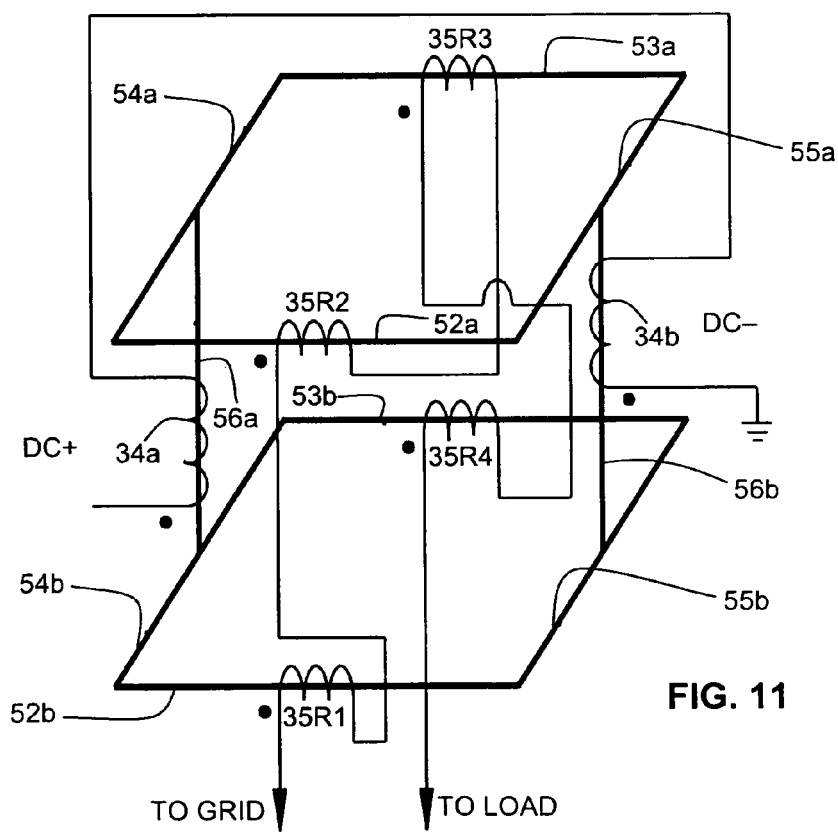
FIG. 11 shows schematically connection of the four AC coils to one phase of the split core shown in FIG. 10.

FIG. 11 shows schematically connection of the four R-phase AC coils to the split core 50 shown in FIG. 10, it being understood that a similar connection is also used for the S and T phases. AC coils 35R1 and 35R2 are wound on limbs 52b and 52a, respectively and AC coils 35R3 and 35R4 are wound on limbs 53a and 53b, respectively. DC bias coils 34a and 34b are wound on limbs 56a and 56b, respectively. The flux caused by AC current during one half cycle in the coils 35R1 and 35R3 will be in opposite direction to the flux caused by the DC bias coils 34a and 34b while flux caused by the current in the coils 35R2 and 35R4 will in the same direction as the flux caused by the DC bias coils 34a and 34b in the same half cycle. The magnetic circuits for flux caused by AC coils 35R1 and 35R4 (as well as by AC coils 35R2 and 35R3) appear as closed magnetic circuits thus exhibiting low impedance in the normal state and high impedance in fault current-limiting state. At the same time the influence of the flux caused by AC coils 35R1, 35R2 (as well as 35R3, 35R4) on the DC magnetic circuits will be negligible since their respective EMFs are in opposite directions such that transformer coupling between AC and DC circuits will be very small.

The invention has been described so far with particular references to a three-phase FCL having a closed magnetic circuit for the DC bias coils and an open magnetic circuit for the AC bias coils. We will refer to this as a closed DC, open AC configuration. However, it is to be understood that the principles of the invention are equally applicable to other configurations as will now be described with references to FIGS. 12 to 14.

Figure 12:
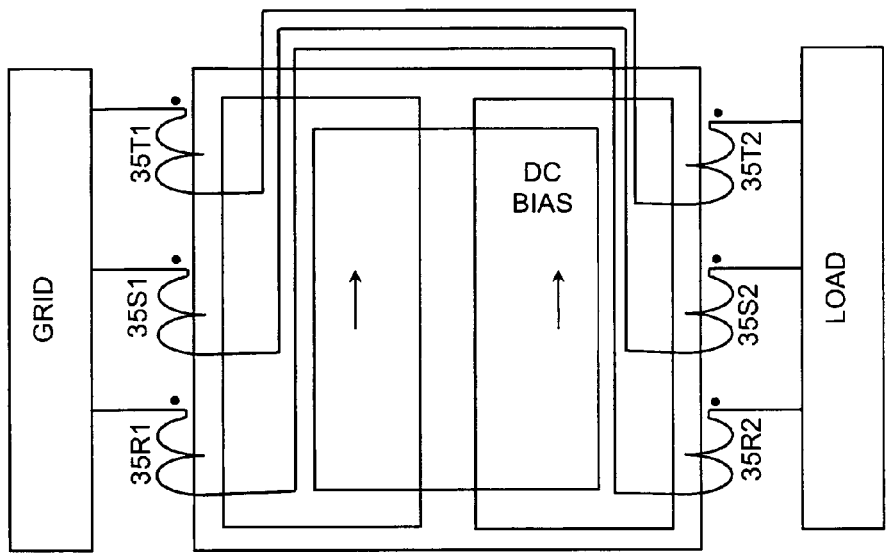
FIGS. 12 to 14 show schematically a simplified design of a three-phase FCL in accordance with various alternative embodiments of the invention.

FIG. 12 shows schematically a simplified design of a three-phase FCL having a closed DC, closed AC configuration. In this configuration, the DC bias and the AC phase coils both form closed magnetic circuits. In the figure, the DC bias resides on the central limb of a "double window" magnetic core type generating unidirectional DC magnetic flux that rotates clockwise in one of the window frames and anticlockwise in the other frame. Frames may also include air gaps making it partially-closed loops. The corresponding coils for each phase are wound in a way that the AC magnetic flux generated by one coil is in parallel with the direction of the DC flux in one limb and anti-parallel to the direction of the DC flux in the other limb. The direction of the AC flux reverses at any half-cycle of the AC field, whereby alternate limbs oppose the DC flux during a full cycle. The AC coils present unbalanced impedance at any given time to drive the core out of saturation in the event of a 3-phase symmetrical fault.

Figure 13:
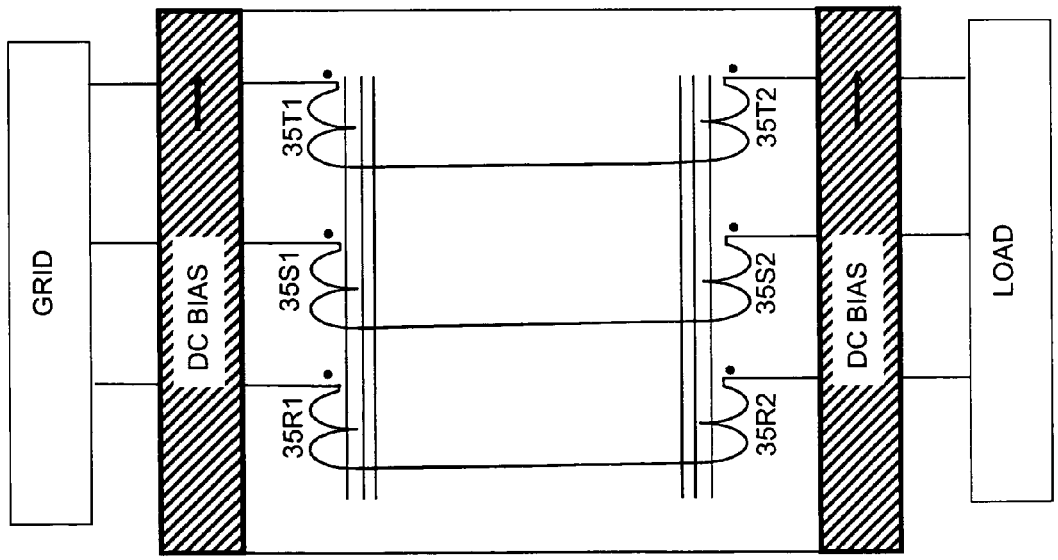

FIG. 13 shows schematically a simplified design of a three-phase FCL having an open DC, open AC configuration. The DC bias circuit is shown in cross-section to make clear that effectively it employs a cylindrical magnet that may be a permanent magnet or an electromagnetic having one or more DC bias coils or a combination thereof. In this configuration, the DC bias source generates a unidirectional magnetic flux in two magnetic core limbs of the AC magnetic circuit mounted within the DC field space. The corresponding coils for each phase are wound in a way that the AC magnetic flux generated by one coil is in parallel with the direction of the DC flux in one limb and anti-parallel to the direction of the DC flux in the other limb. The direction of the AC flux reverses at any half-cycle of the AC field, whereby alternate limbs oppose the DC flux during a full cycle. The AC coils present unbalanced impedance at any given time to drive the core out of saturation in the event of a 3-phase symmetrical fault.

Figure 14:
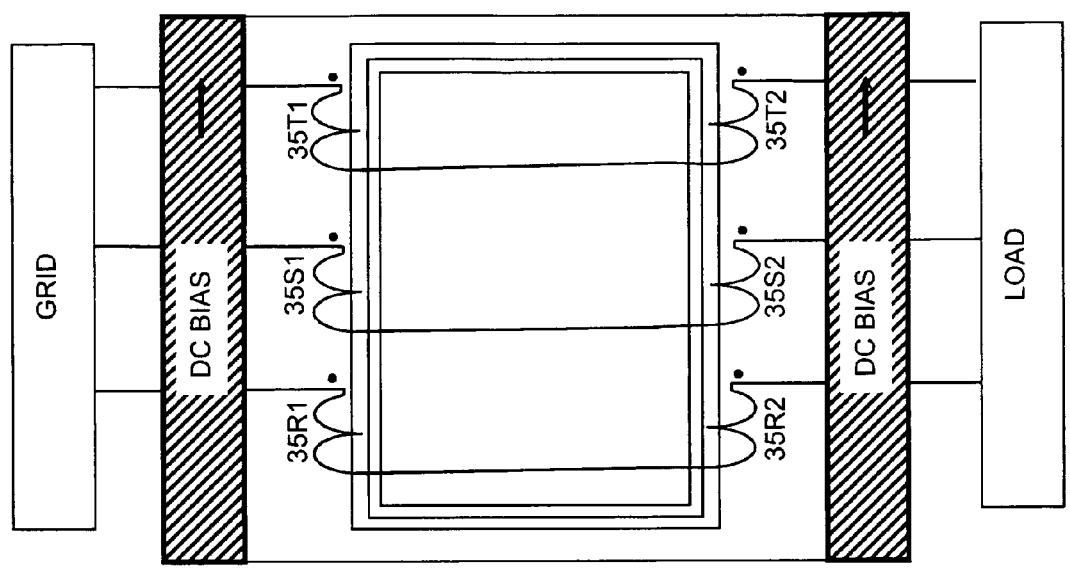

FIG. 14 shows schematically a simplified design of a three-phase FCL having an open DC, closed AC configuration. The DC bias circuit is shown in cross-section to make clear that effectively it employs a cylindrical magnet that may be a permanent magnet or an electromagnetic having one or more DC bias coils or a combination thereof. In this configuration, the DC bias forms an open magnetic circuit while the AC phase coils are mounted on a magnetic core frame forming a closed magnetic loop. The magnetic frame may also include one or more air gaps making it a partially closed loop. In this example, the DC bias source generates a unidirectional magnetic flux in two magnetic core limbs of the AC magnetic circuit on which the AC coils are mounted. The corresponding coils for each phase are wound in a way that the AC magnetic flux generated by one coil is in parallel with the direction of the DC flux in one limb and anti-parallel to the direction of the DC flux in the other limb. The direction of the AC flux reverses at any half-cycle of the AC field, thus alternate limbs oppose the DC flux during a full cycle. The AC coils present unbalanced impedance at any given time to drive the core out of saturation in the event of a 3-phase symmetrical fault.

It should be noted that in all embodiments having two DC bias coils the parameters of the bias coils and the DC supply may be chosen such that in case of a fault in one bias coil (or its cooling system), the second bias coil may provide acceptable parameters of the FCL. Thus a high reliability of the FCL is achieved. Likewise, in all embodiments the DC may be achieved using permanent magnets, either singly or in combination with DC bias coils.

The foregoing description describes some embodiments of this invention. Modifications, obvious to those skilled in the art, can be made thereto without departing from the scope of the invention as defined by the appended claims. The appended claims also form part of the disclosure of the invention and are intended to highlight distinctive features thereof.

The invention claimed is:

1. A three-phase current limiting device (30) for an alternating current system, the three-phase current limiting device comprising:

an AC magnetic circuit having at least one AC coil (35R1, 35S1, 35T1) for each phase of a 3-phase AC supply, wound on a saturable ferromagnetic core and configured to subject the at least one AC coil for each phase to a common magnetic flux, and a DC magnetic circuit (34a, 34b) for biasing the AC magnetic circuit into saturation at normal conditions;

said AC coils being configured that in use they are connected in series with a load and during alternate half cycles of the 3-phase AC supply at least one of the AC coils produces a magnetic field that opposes a magnetic field of the DC magnetic circuit; and said AC coils (35R, 35S, 35T) for each phase being configured so that at least one of the AC coils exhibits unbalanced magnetic impedance relative to remaining ones of the AC coils for each phase, wherein the AC coils are wound with different numbers of turns so as to achieve asymmetrical magnetic impedance and/or wherein the AC coils have different coil geometries so as to achieve asymmetrical magnetic impedance.

2. The three-phase current limiting device according to claim 1, wherein the AC magnetic circuit is open and the DC magnetic circuit is closed.

3. The three-phase current limiting device according to claim 1, wherein the AC magnetic circuit is open and the DC magnetic circuit is open.

4. The three-phase current limiting device according to claim 1, wherein the AC magnetic circuit is closed and the DC magnetic circuit is open.

5. The three-phase current limiting device according to claim 1, wherein the AC magnetic circuit is closed and the DC magnetic circuit is closed.

6. The three-phase current limiting device according to claim 1, wherein the DC magnetic circuit includes at least one DC bias coil (34a, 34b) wound around a limb of the saturable ferromagnetic core.

7. The three-phase current limiting device according to claim 6, wherein the at least one DC bias coil (34a, 34b) is a superconducting coil.

8. The three-phase current limiting device according to claim 1, wherein:

the saturable ferromagnetic core comprises two opposing limbs;

a DC bias limb is coupled intermediate the opposing limbs, and said at least one DC bias coil (34a, 34b) is wound around the DC bias limb.

9. The three-phase current limiting device according to claim 1, wherein the DC magnetic circuit includes a permanently magnetized core.

10. The three-phase current limiting device according to claim 1, wherein the saturable ferromagnetic core comprises a plurality of limbs, and the AC coils are disposed on different portions of the limbs of the saturable ferromagnetic core so as to achieve asymmetrical magnetic impedance.

11. The three-phase current limiting device according to claim 1, wherein at least two of the AC coils associated with different phases are at least partially overlapping.

12. The three-phase current limiting device according to claim 1, wherein the saturable ferromagnetic core comprises a plurality of limbs on which the AC coils are disposed, and at least one respective decoupling loop is wound on each of the limbs on which the AC coils are disposed so as to at least partially inhibit flux transfer between the AC coils and thereby control mutual magnetic impedance between the AC coils.

13. The three-phase current limiting device according to claim 12, wherein the decoupling loops serve as short-circuit coils.

14. The three-phase current limiting device according to claim 12, wherein the decoupling loops are connected to a variable external load.

15. The three-phase current limiting device according to claim 12, wherein the decoupling loops are constructed so as to allow their number of turns and/or cross-sections to be changed during use.

16. A three-chase current limiting device (30) for an alternating current system, the three-phase current limiting device comprises:

an AC magnetic circuit having three AC coils (35R1, 35S1, 35T1) for each phase of a 3-phase AC supply, the AC magnetic circuit being configures to subject the at least one AC coil for each phase to a common magnetic flux, and the three AC coils being wound around two opposing limbs (33a, 33b) of a singe saturable ferromagnetic core such that the saturable ferromagnetic core appears as open magnetic circuit for flux caused b AC currents and offers low impedance at normal and applicable overload conditions;

a DC magnetic circuit (34a, 34b) for biasing the AC magnetic circuit into saturation at normal conditions, the single saturable ferromagnetic core being configures to form a closed magnetic circuit for flux produced by the DC magnetic circuit, and the DC magnetic circuit is being adapted to maintain the two opposing limbs (33a, 33b) of the saturable ferromagnetic core in a state of saturation in normal and applicable overload conditions, wherein the AC coils is configured that in use they are connected in series with a load and during alternate half cycles of the 3-phase AC supply at least one of the AC coils produces a magnetic field that opposes a magnetic field of the DC magnetic circuit; and the AC coils (35R, 35S, 35T) for each phase being configured so that at least one of the AC coils exhibits unbalanced magnetic impedance relative to remaining ones of the AC coils for each phase; and the AC coils being arranged on the saturable ferromagnetic core such that for a short circuit in phase to ground in any combination of the three phases, the magnetic field caused by AC current draws the corresponding limb (33a, 33b) or part of it out of saturation whereby the impedance of the corresponding AC coils automatically increases to provide required current limiting capability.

17. The three-phase current limiting device as claimed in claim 16, wherein the DC bias circuit includes at least one DC bias coil (34a, 34b) wound on one or more limbs (32a, 32b) of the magnetic core (31).

18. The three-phase current limiting device according to claim 17, wherein the at least one DC bias coil (34a, 34b) is a superconducting coil.

19. The three-phase current limiting device as claimed in claim 17, wherein the AC coils are arranged with axes perpendicular to the respective axis of the at least one DC bias coil whereby transformer coupling between AC and the at least one DC bias coil is reduced or eliminated.

20. The three-phase current limiting device as claimed in claim 16, wherein the DC bias circuit includes a permanently magnetized core.

21. The three-phase current limiting device according to claim 16, wherein at least two of the AC coils associated with different phases are wound with different numbers of turns so as to achieve unbalanced magnetic impedance.

22. The three-phase current limiting device according to claim 16, wherein the saturable ferromagnetic core comprises a plurality of limbs, and the AC coils associated with different phases are disposed on different portions of the limbs of the saturable ferromagnetic core so as to achieve unbalanced magnetic impedance.

23. The three-phase current limiting device according to claim 16, wherein the AC coils associated with different phases have different coil geometries so as to achieve unbalanced magnetic impedance.

24. The three-phase current limiting device according to claim 16, wherein at least two of the AC coils associated with different phases are at least partially overlapping.

25. The three-phase current limiting device according to claim 16, wherein at least one respective decoupling loop is wound on each of the opposing limbs so as to at least partially inhibit flux transfer between the AC coils associated with different phases and thereby control mutual magnetic impedance between the AC coils.

26. A single or three phase current limiting device (50) for an alternating current system comprising:
   a split magnetic core with two spaced apart magnetic circuits formed by annular cores (51a,51b) each comprising a respective pair of first limbs joined by respective second limbs, opposing ones of which form two annular parallel closed DC magnetic circuits for flux caused by at least one DC DC bias coil surrounding one or more respective bias limbs, each of said bias coils being adapted to maintain the respective pairs of first limbs (52a, 52b, 53a, 53b) in saturation state in normal and applicable overload conditions;
   the split magnetic core forming also two annular closed magnetic circuits in a plane perpendicular to DC coil(s) axis for flux caused by AC coils (by means limbs 52a, 53a,54a, 55a, and 52b, 53b, 54b, 55b);
   the AC coils for each phase (R, S, T) wound around said respective pairs of first limbs (52a, 52b, 53a, 53b) and connected in series such that the split magnetic core appears as two open magnetic circuits for a first flux caused by AC current in said respective pairs of first limbs (52a, 52b, 53a, 53b) and two closed magnetic circuits for a second flux caused by AC current in said respective pairs of first limbs (52a, 53a, 52b, 53b);
   the AC coils being arranged on said respective pairs of first limbs in such a way that flux changes and corresponding voltage drop in normal conditions are in a specified range;
   the AC coils being arranged sequentially on said respective pairs of first limbs in such a way that in case of a single phase device throughout a range of possible short circuit (fault) currents, an impedance of the AC coils automatically increases thus providing a required current limiting capability and in case of a three phase device, a required current-limiting is provided for one, two or three phase short circuit.

27. The three-phase current limiting device according to claim 26, wherein the at least one DC bias coil (34a, 34b) is a superconducting coil.

28. The three-phase current limiting device according to claim 26, wherein the DC magnetic circuit includes a permanently magnetized core.

29. The three-phase current limiting device according to claim 26, wherein at least two of the AC coils associated with different phases are wound with different numbers of turns so as to achieve unbalanced magnetic impedance.

30. The three-phase current limiting device according to claim 26, wherein the AC coils associated with different phases are disposed on different portions of said respective pairs of first limbs so as to achieve unbalanced magnetic impedance.

31. The three-phase current limiting device according to claim 26, wherein the AC coils associated with different phases have different coil geometries so as to achieve asymmetrical magnetic impedance.

32. The three-phase current limiting device according to claim 26, wherein at least two of the AC coils associated with different phases are at least partially overlapping.

33. The three-phase current limiting device according to claim 26, wherein at least one respective decoupling loop is wound on said respective pairs of first limbs so as to at least partially inhibit flux transfer between the AC coils and thereby control mutual magnetic impedance between AC coils.

34. The three-phase current limiting device according to claim 33, wherein the decoupling loops serve as a short-circuit coils.

35. The three-phase current limiting device according to claim 33, wherein the decoupling loops are connected to a variable external load.

36. The three-phase current limiting device according to claim 33, wherein the decoupling loops are constructed so as to allow their number of turns and/or cross-sections to be changed during use.

\* \* \* \* \*